April 8, 1952 R. C. BECKETT 2,592,380
CRANK CASE VENTILATOR VALVE
Filed Dec. 11, 1947

Inventor
Ronald C. Beckett
by Douglas S. Johnson
Agent

Patented Apr. 8, 1952

2,592,380

UNITED STATES PATENT OFFICE 2,592,380

CRANKCASE VENTILATOR VALVE

Ronald Carey Beckett, Galt, Ontario, Canada

Application December 11, 1947, Serial No. 791,061

4 Claims. (Cl. 137—153)

This invention relates to crankcase ventilator valves for internal combustion engines and the principal object of the invention is to provide an extremely effective and reliable valve adapted to be connected between the crankcase and intake manifold of an engine, which valve will automatically and accurately respond to vacuum conditions in the intake manifold to provide maximum valve opening and hence maximum crankcase ventilation under engine starting or accelerating conditions when large quantities of crankcase gases are produced and will, under normal engine operation automatically reduce the ventilation to ensure a high manifold vacuum, leaving the carburation unimpaired.

A further important object is to provide a crankcase ventilator valve which will have a very gradual closing action and which will gradually move to a closed position under increasing manifold vacuum.

A still further object is to provide a crankcase valve which will automatically close when the engine is stopped and will therefore be closed at the instant of starting.

A further object is to provide a valve which will be extremely easy to assemble and service.

The principal feature of the invention consists in providing a cylinder adapted for connection between the intake manifold and crankcase of an internal combustion engine, and slidably mounting in the cylinder a piston having ports therein and formed with an axially extending stem tapering from an enlarged outer end to a reduced inner end, the cylinder being provided with a restricting means adjacent the end connected with the crankcase to provide a reduced central orifice through which said tapered stem operates to provide a valving action under actuation of the piston by varying manifold vacuum conditions, and a spring for urging the piston against the restriction means.

A further important feature consists in forming the cylinder restricting means through which the tapered piston stem operates as a removable orifice disc and providing an annular shoulder in the cylinder against which the disc abuts, the disc being held against the annular shoulder by a threaded nipple to form a seat against which the piston is adapted to close under action of the spring to close the ports therein.

Referring to the accompanying drawings.

Figure 1:
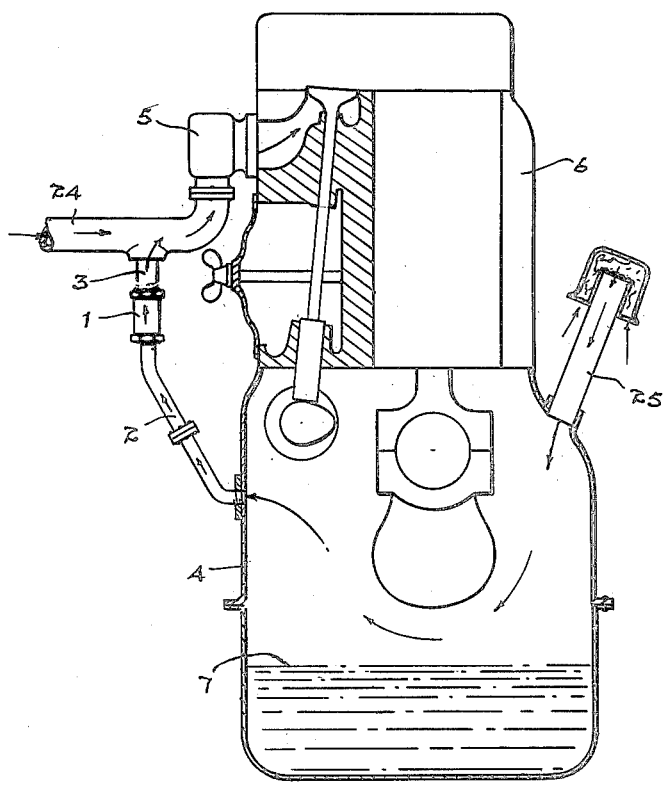
Figure 1 is a part sectional part elevational view of an engine illustrating the manner in which my ventilator valve unit is connected between the crankcase and intake manifold.

It has been found in practice that crankcase ventilation is very desirable in internal combustion engines. With proper ventilation the crankcase atmosphere is prevented from becoming super-saturated with contaminating materials in the Blowby gases or those formed as the result of oil deterioration by removing the contaminating materials and thus eliminating the inherent harmful effects such as rust, corrosion and improper lubrication occasioned thereby.

Various forms of valve arrangements for use in a crankcase ventilating system have been proposed but few have been found effective due to their inability to regulate the ventilation accurately in accordance with the engine operation.

The present invention has accordingly been devised to provide a valve for connection between the crankcase and intake manifold to accurately and progressively respond to intake manifold vacuum conditions to provide the desired crankcase ventilation without in any way impairing the manifold vacuum or engine operation.

With reference to the accompanying drawings, I show my valve unit, generally designated as 1, connected by tubes 2 and 3 between the crankcase 4 and intake manifold 5 respectively of an internal combustion engine 6. The tube 2 communicates with the interior of the crank case 4 above the oil or liquid level 7.

Figure 2:
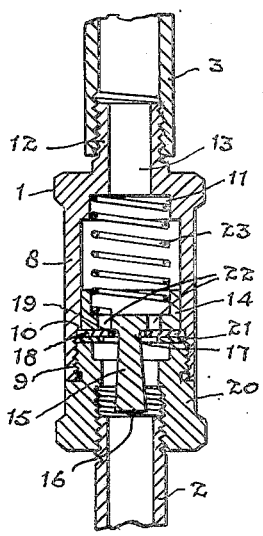
Figure 2 is a vertical mid-sectional view of my valve showing the piston abutting the orifice disc to shut the valve when the engine is inoperative.
Figure 3:
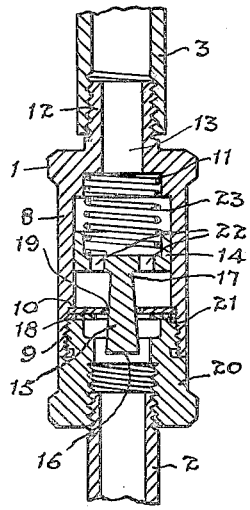
Figure 3 is a view similar to Figure 2 but showing the piston raised from the orifice disc under action of the manifold vacuum and illustrating clearly the valving action obtained with the tapered piston stem and the disc orifice.

Referring to Figures 2 and 3, my valve comprises a cylinder or tube 8 having an enlarged internally threaded bore 9 adjacent one end defining an annular shoulder 10 and a reduced bore 11 adjacent the opposite end. Projecting from the end of the cylinder having the reduced bore 11 is a reduced extension 12 which is externally threaded and provided with a central bore 13 communicating with but of a smaller diameter than the reduced cylinder bore 11.

Slidably mounted in the bore of the cylinder 8 is a piston 14 which is generally cup-shaped and is provided with an axially extending stem 15 projecting from its bottom face, the stem being of tapered form and tapering inwardly from its outer end 16 to its reduced inner end 17.

Arranged in the cylinder and abutting the annular shoulder 10 is a disc 18 provided with a central orifice 19 of a slightly larger diameter than the diameter of the enlarged outer stem end 16. The disc or orifice plate 18 is held in the cylinder by means of a nipple 20 which engages the enlarged internally threaded bore 9. A suitable gasket 21 is interposed between the end of the nipple and the disc 18.

As shown in Figures 2 and 3, the piston 14 is arranged in the cylinder so that the stem 15 operates through the orifice 19 of the disc 18 to provide an annular passage between the stem and the disc, the size of which is varied relative to the position of the piston.

The bottom wall of the piston is provided with ports 22 radially spaced from the piston axis and these ports are adapted to be closed by the disc 18 when the piston is in abutting relation therewith, as shown in Figure 2.

A compression spring 23, of a diameter to fit the reduced cylinder bore 11 and the inner diameter of the piston in which one end of it is seated, serves to urge the piston into engagement with the disc 18.

In fitting my valve for crankcase ventilation the nipple 20 is connected to the tube 2, while the reduced extension 12 of the cylinder is threaded into the tube 3 connected with the manifold.

In operation the manifold vacuum will draw the piston upwardly against the spring 23 and the air flow in the inlet tube 24 of the manifold rushing past the mouth of the tube will draw the crankcase fumes and gases away through the tube 2 and draw fresh air in through the breather 25.

The quantity of gas drawn off from the crankcase will of course depend upon the size of the annular opening between the valve stem 15 and the disc 18, the gases first passing through this annular opening and then through the valve ports 22 to the manifold. Thus the ventilation will depend upon the position of the piston and the piston's position will, in turn depend upon the degree of vacuum in the manifold.

When the motor or engine is dead the spring 23 will maintain the piston in abutment or contact with the orifice plate or disc 18, closing the ports 22 so that at the instant of starting no leakage path between the crank case and the intake manifold is provided and at the instant of starting the intake manifold vacuum will be unimpaired.

Under open throttle starting conditions when the manifold vacuum is low and the airflow in the inlet tube 24 is high the effect of the manifold vacuum will be sufficient only to raise the piston a short distance off the disc 18, thus leaving a large passageway between the disc and piston stem to permit large volumes of gas to be drawn through the piston ports 22 to relieve any excess of crankcase gases produced during the starting operation.

Similarly under accelerating conditions when again large amounts of crankcase fumes are produced the manifold vacuum will be relatively low the piston will be raised only slightly and the valve will be maximum increasing the ventilating effect.

Under normal road load conditions the manifold vacuum will be in the mid-range and the airflow through the inlet pipe or tube 24 will be a maximum with the increase in vacuum over and above accelerating conditions more than offsetting the reduction of orifice opening, providing maximum crankcase ventilation.

It will be appreciated that from the tapered construction of the valve stem 15 a very gradual change of the size of the opening between the valve stem and the disc 18 is produced, and hence the valve will be extremely sensitive and will accurately respond to vacuum conditions of the manifold piston over a wide range.

Further, it will be appreciated that, with the construction of the valve stem whereby the stem tapers from its outer end 16 inwardly to its inner end 17, a closing of the valve is experienced upon upward movement of the piston, while at the same time when the piston moves to its most downwardly position, the valve is completely closed.

With the construction described the valve parts may be readily made and quickly assembled, the spring 23 and piston 14 being quickly inserted into the cylinder 8, the orifice plate or disc 18 positioned against the shoulder 10 and the nipple 20 threaded into position to hold the disc in place to serve as a valve seat for the piston.

It may be found to be advantageous to employ some form of filtering element in the tube 2 to prevent sludge and other foreign matter from being carried upwardly by the crankcase fumes into the valve structure to cause freezing or corroding of the valve. The actual construction of the valve however and the operation of the stem 15 through the orifice 19 serves to provide the necessary wiping action to prevent the valve from clogging, reducing the danger of freezing to a minimum.

In addition, it will be understood that the valve can be quickly threaded onto the tubes 2 and 3 and may be readily dismantled when servicing is required.

While I have shown the valve stem 15 as operating through a removable disc 18, it will be understood that the cylinder might in itself be formed with a suitable restriction through which the tapered piston stem could operate, or other suitable arrangements might be resorted to without departing from the scope of my invention.

What I claim as my invention is:

1. A crankcase ventilator valve or the like comprising a cylinder having a central bore and formed with a threaded tubular extension extending from one end and with an enlarged bore at the other end defining an internal annular shoulder, a cup-shaped piston slidably mounted in the bore of said cylinder and having an axially extending stem of circular cross section projecting outwardly from the end wall thereof and tapering uniformly inwardly from a maximum diameter at the outer end to a minimum diameter at the piston, said piston having ports extending through the end wall thereof, a disc arranged in said cylinder and abutting said annular shoulder, said disc being formed with a central orifice of a size greater than the maximum diameter of said stem, said stem being arranged to project through said orifice, a nipple threaded into the said enlarged cylinder bore and holding said disc against said shoulder, and a compression spring seated within the piston and engaging the end of the cylinder remote from said disc for urging the piston against said disc with its stem projecting through said central orifice, said piston having its ports spaced outwardly of said central orifice to close said ports and central orifice upon contacting said disc and being operable under varying pressures applied to said cylinder through said tubular extension to operate said tapered stem through said disc orifice to provide a valving action to progressively decrease the effective size of said orifice to a minimum towards the outer end of said stem.

2. In a valve of the type described, a cylinder, a piston slidably mounted in said cylinder and formed with an axially extending stem tapering from the outer end and progressing uniformly from a maximum diameter at said outer end to a minimum diameter at said piston, a restriction within said cylinder having a central orifice to receive said stem and of a diameter greater than the maximum diameter at the outer end of said stem permitting said stem to be drawn completely through said orifice without closing said orifice, a spring urging said piston into contact with said restriction, ports in said piston closed by said restriction with said piston in contact therewith, and an outlet leading from said cylinder adapted to be connected to apply a varying vacuum condition to said cylinder to move said piston out of engagement with said restriction providing through said axially extending stem upon progressively increasing vacuum, a valving action to progressively and uniformly decrease the effective size of said orifice to a minimum orifice opening as the outer end of said stem is drawn through said orifice.

3. A crankcase ventilator valve or the like, comprising a cylinder having a central bore, a disc having a central orifice therethrough removably mounted in the bore of said cylinder adjacent one end, a cup-shaped piston slidably mounted in the bore of said cylinder and having a close sliding fit therewith and having a stem extending axially from the underside of the bottom wall thereof through said central orifice, said stem having a circular cross section and tapering uniformly from a maximum diameter at its outer end remote from the piston to a minimum diameter at its inner end adjacent the piston with said maximum diameter being less than the diameter of said central orifice, said piston bottom wall being formed with ports spaced from the piston axis a distance greater than the radius of said central orifice to be sealed upon movement of said piston into contact with said disc to close said central orifice, a spring for urging said piston against said disc to close said ports and central orifice, and an outlet leading from said cylinder adapted to be connected to apply a varying vacuum condition to said cylinder to actuate said piston to move out of contact with said disc and to vary the positions of said stem to control without closing the effective size of said central orifice.

4. A device as claimed in claim 3 in which said cylinder is formed with a stop to engage said piston and located with respect to said disc to limit said piston stem from moving entirely out of said central orifice as it operates therethrough.

RONALD CAREY BECKETT.

REFERENCES CITED

The following references are of record in the file of this patent:

UNITED STATES PATENTS

| Number | Name | Date |
|---|---|---|
| 746,402 | Sutton | Dec. 8, 1903 |
| 1,558,238 | Charter | Oct. 20, 1925 |
| 2,093,015 | Madden | Sept. 19, 1937 |
| 2,204,757 | Henze | June 18, 1940 |
| 2,240,459 | McDowell | Apr. 29, 1941 |
| 2,362,558 | Janzich | Nov. 14, 1944 |
| 2,481,460 | Williams | Sept. 6, 1949 |